US 6,740,136 B2

(12) United States Patent
Duffy

(10) Patent No.: US 6,740,136 B2
(45) Date of Patent: May 25, 2004

(54) INTERCONNECTED FILTER FRAME AND FILTER FRAMING METHOD

(75) Inventor: Dean R. Duffy, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 85 days.

(21) Appl. No.: 09/977,057

(22) Filed: Oct. 12, 2001

(65) Prior Publication Data
US 2003/0070406 A1 Apr. 17, 2003

(51) Int. Cl.$^7$ ............................................. B01D 46/10
(52) U.S. Cl. .................... 55/497; 55/500; 55/501; 55/502; 55/503; 55/507; 55/509; 55/511; 55/514; 55/521; 55/524; 55/DIG. 31
(58) Field of Search .................... 55/497, 499, 500, 55/501, 502, 503, 507, 509, 511, 514, 521, 524, DIG. 31; 210/493.1, 493.3, 493.5; 96/153, 154

(56) References Cited

U.S. PATENT DOCUMENTS

| | | | |
|---|---|---|---|
| 1,832,281 A | | 11/1931 | Davies |
| 2,032,262 A | | 2/1936 | Cori |
| 2,058,669 A | | 10/1936 | Dollinger |
| 2,135,863 A | * | 11/1938 | Walker ........................ 55/499 |
| 2,211,382 A | * | 8/1940 | Nutting ........................ 55/500 |
| 3,487,610 A | | 1/1970 | Brown et al. |
| 3,712,033 A | * | 1/1973 | Gronholz ..................... 55/497 |
| 3,873,288 A | * | 3/1975 | Wachter et al. ............... 55/497 |
| 3,971,373 A | | 7/1976 | Braun |
| 4,386,948 A | | 6/1983 | Choksi et al. |
| 4,617,122 A | | 10/1986 | Kruse et al. |
| 5,288,298 A | * | 2/1994 | Aston ........................... 55/524 |
| 5,376,270 A | * | 12/1994 | Spearman ..................... 55/497 |
| 5,501,794 A | * | 3/1996 | Van de Graaf et al. .. 210/493.3 |
| 5,531,892 A | * | 7/1996 | Duffy ........................... 55/497 |
| 5,840,094 A | | 11/1998 | Osendorf et al. |
| 5,885,455 A | | 3/1999 | Graus et al. |
| 6,045,599 A | * | 4/2000 | Solberg, Jr. .................. 55/503 |
| 6,074,450 A | | 6/2000 | Raber |
| 6,302,946 B1 | * | 10/2001 | Cronia et al. ................. 96/154 |
| 6,397,842 B1 | * | 6/2002 | Lee .............................. 55/497 |
| 6,406,509 B1 | * | 6/2002 | Duffy ........................... 55/497 |

FOREIGN PATENT DOCUMENTS

| | | | |
|---|---|---|---|
| EP | 2 795 656 | 6/1999 | |
| JP | Hei 9-276637 | 10/1997 | |
| JP | 2001-62232 | * 3/2001 | ........... B01D/46/52 |
| JP | 2001062232 | 3/2001 | |
| WO | WO 94/11089 | 5/1994 | |

* cited by examiner

Primary Examiner—Duane Smith
Assistant Examiner—Jason M. Greene
(74) Attorney, Agent, or Firm—Gary L. Griswold; Robert W. Sprague; William J. Bond

(57) ABSTRACT

A filter product includes a filtration media combined with a multi-component frame assembly that can effectively support the filtration media in place proximal to its edges and in accordance with its desired orientation and wherein the assembly can be selectively taken apart to provide access to the filtration media by way of a releasable lock connection. Preferably, a snap-fit releasable locking system is incorporated within the frame design. The present invention is particularly applicable to filtration media comprising pleated filtration media. Such support features include rack-like media engagement elements, which elements are advantageously provided so as to preferably engage the filtration media proximal to its side and end edges from above and below to preferably compress and ensure an effective seal and support connection between the frame and the filtration media. Such a construction is further beneficial for supporting filtration media that includes a layer or other loading of particulate matter therein. The media engagement elements are spaced along the side of a support frame and a hold down frame and the side frame elements include sidewalls in combination. The sidewalls are spaced from the media engagement elements so as to support and preferable compress the filtration media inward from its side and end edges to support and effectively contain the filtration media and any particulate material therein.

21 Claims, 6 Drawing Sheets ers. Otherwise, the entire frame or any selective portion thereof may be made integral. That is, a frame portion comprising multiple elements made together may be provided, such as, for example, by an injection molding process. In any case, the one or more frame elements must be assembled and connected with the filtration media by a selective assembly process. Such a selective assembly process requires manipulations of the elements for assembly.
INTERCONNECTED FILTER FRAME AND FILTER FRAMING METHOD

TECHNICAL FIELD

The present invention is directed to a multiple element framing construction for making a frame about filter media to create a framed filter product that may be shaped for a specific application. In particular, the present invention is directed to such a framing construction and method of assembly whereby multiple frame components are assembled together so as to position and hold filtration media in place.

BACKGROUND OF THE INVENTION

Filter products typically include a quantity of filtration media and a frame that is not only sized and shaped to partially enclose and support the filtration media, but also sized and shaped so that the filter product can be inserted or supported in place based upon a particular application. Conventionally, filter frames have been constructed from multiple elements that are assembled together or connected to the filtration media, such as about its perimeter, so as to provide the support and application-specific filter frame. Such frame elements are known to be made from a variety of materials, including metals, plastics, and paperboard. In the case of a rectangular filter product, for example, a rectangular filtration media is surrounded at its four sides by frame pieces that may be connected at the corners and/or connected to the four side edges of the filtration media. The majority of the filtration media is thus capable of use for its filtering ability.

Moreover, these typical frame elements comprise three-dimensional elements that are sized and shaped to partially enclose the filtration media at its edges. The frame may comprise multiple pieces assembled by use of adhesive, welding, friction fit, snap fits, mechanical fasteners, or like. Otherwise, the entire frame or any selective portion thereof may be made integral. That is, a frame portion comprising multiple elements made together may be provided, such as, for example, by an injection molding process. In any case, the one or more frame elements must be assembled and connected with the filtration media by a selective assembly process. Such a selective assembly process requires manipulations of the elements for assembly.

Many types of filter products have also been developed for many different types of applications. Applications often are based in large part upon the characteristics of the filtrate and the carrier fluid and upon the support requirements of the system of the particular application. Filtering requirements may make it necessary to construct the filter products under construction specifications that ensure that all carrier fluid and filtrate must pass through the filter product. This may require appropriate sealing mechanisms between the frame and its system support, for example by one or more gaskets, and between the frame and the filtration media, for example by adhesive sealant. Such adhesive sealant may be provided as a bead extended along the entire frame at an interface between the frame and the filtration media. For example, a typical high-efficiency particulate air (HEPA) filter uses pleated filtration media sealed about its edges to a frame that is provided about its complete perimeter. Thus, the filtration media and frame provide a fluid tight assembly that prevents bypass of unfiltered carrier fluid.

Some filter products require frames that hold and support the filtration media in place. For example, the filtration material may be supported as pleated filtration media sized and shaped for a particular application. Such framing elements may be responsible for maintaining the pleats and supporting the filtration media in position (i.e. spacing and properly orienting the pleats of the filtration media). This supporting function may be done by frame elements having pleat shaped supports that can be provided to contact the filtration media along one or more of the edges of the pleated filtration media and/or at intermediate locations. That is, the pleat supporting element may be separate from the side edge frame elements. An example of such an element that is connected with the edge frame is described in U.S. Pat. No. 2,058,669 to Dollinger.

Other frame constructions support such a pleated filtration media in position from side edge support features that also connect the edges of the filtration media to the frame elements to make sure that substantially all carrier fluid and filtrate passes through the filtration media portion of the filter product. As examples, U.S. Pat. No. 4,617,122 to Kruse et al, Japanese published unexamined application Hei 9-276637 and French published application no. 795656 describe rectangular edge frames having pleat shaped supporting features for supporting parallel spaced side edges of pleated filtration media and a hold down frame having cooperating features for meshing with those of the frame to hold the filtration media in position. The Kruse et al and Japanese references disclose, in particular, that such pleat supporting features comprise a pleat shaped surface formed as a ledge adjacent to and extending along a side wall of the supporting frame or the hold down frame, respectively, with the other frame component having a similarly defined edge. The French reference discloses such a pleat shaped surface that comprises the upper edge of its frame element and a lower edge of its hold down frame.

The cooperating side edge supporting features of these prior art filter frames effectively support the pleated filtration media along a pair of spaced side edges, and these supporting features further pinch or crimp the spaced edges of the filtration media. However, such pinching or crimping structures tend to crush the media along the filtration media edges, which crushing can produce powdered media and/or dislodged particulate material contained in the media (from filtration media granules, such as carbon) that can become lost from the filtration media. Also, such a pinching or crimping action tends to cause the filtration media to shift inward from the pinched or crimped edges, which shifting can cause the filtration media to become loose or not effectively supported at edge portions.

Also, some filter products, including those of the type having filtration media supporting features for pleats, are designed to provide for replaceable filtration media. Typically, the filtration media is accessible by removing one or more of multiple frame portions from another. That is, a frame element, such as might include a pleat supporting feature, may be removed so as to permit the filtration media to be removed. Then, a new quantity of filtration media may be supported in position followed by reassembling the frame elements to create a filter product with new filtration media. The aforementioned Kruse et al US patent, Japanese published application and French published application disclose the possibility of removing and replacing the filtration media.

SUMMARY OF THE PRESENT INVENTION

The present invention overcomes the deficiencies and shortcomings of the prior art by providing a filter product having filtration media combined with a multi-component frame assembly that can effectively support the filtration media in place proximal to its edges and in accordance with its desired orientation and wherein the assembly can be selectively taken apart to provide access to the filtration media by way of a releasable lock connection. Preferably, a snap-fit releasable locking system is incorporated within the frame design.

Moreover, the present invention provides for the supporting of the filtration media proximal to its edges and to preferably at least slightly compress the filtration media proximal to its edges so as to effectively seal the filtration media with the frame components. Specifically, support features are preferably provided from plural cooperating components so that the support features work together in a meshing relationship to support and preferably compress the filtration media and to sealingly connect the filtration media to the frame.

The present invention is particularly applicable to filtration media comprising pleated filtration media. Such support features include rack-like media engagement elements, which elements are advantageously provided so as to preferably engage the filtration media proximal to its side and end edges from above and below to preferably compress and ensure an effective seal and support connection between the frame and the filtration media. Such a construction is further beneficial for supporting filtration media that includes a layer or other loading of particulate matter therein. The cooperating media engagement elements effectively seal the filtration media proximal to its edges to hold the particulate matter within the media. For non-pleated media, other supporting features can be utilized in accordance with the present invention.

More preferably, the media engagement elements are spaced along the side frame elements of frame components that comprise a support frame and a hold down frame and the side frame elements include sidewalls in combination. The sidewalls are spaced from the media engagement elements so as to support and preferable compress the filtration media inward from its side and end edges to support and effectively contain the filtration media and any particulate material therein. Moreover, by spacing the media engagement elements from the sidewalls, channels can be provided to extend along the frame adjacent to the filtration media edges. Preferably, a continuous channel is created along the frame. More preferably, continuous channels are provided above and below the filtration media. The support frame and hold down frames are preferably assembled and releasably locked together, at which locked assembly, the media engagement elements are positioned properly to correctly and effectively support and preferably compress and seal the filtration media to the frame assembly.

In accordance with one aspect of the present invention, the above advantages are achieved by a filter product comprising filtration media and a frame assembly provided along at least a portion of an edge of the filtration media, the filter product having an input face and an output face of the filtration media for permitting carrier fluid to pass therethrough while removing a filtrate component, the frame assembly comprising a support frame having a length and extending along at least the portion of the filtration media, the support frame comprising a plurality of media engagement elements arranged in supporting contact with and proximal to the edge of the filtration media on a first side of the filtration media; and a hold down frame having a length and extending along at least the portion of the filtration media, the hold down frame comprising a plurality of media engagement elements arranged in supporting contact with and proximal to the edge of the filtration media on a second side of the filtration media, wherein the support frame and hold down frame are interactively assembled together to provide the frame assembly along and proximal to at least a portion of the edge of the filtration media with the media engagement elements of the support frame interacting with the media engagement elements of the hold down frame to support the filtration media inbetween by contacting the filtration media at its first and second sides, and at least one of the support frame and the hold down frame further includes a wall portion spaced from its media engagement elements so as to define a channel positioned to run along the portion of the edge of the filtration media.

In accordance with another aspect of the present invention, the above advantages are achieved by a filter product comprising filtration media and a frame assembly provided along at least a portion of an edge of the filtration media, the filter product having an input face and an output face of the filtration media for permitting carrier fluid to pass therethrough while removing a filtrate component, the frame assembly comprising a support frame having a length and extending along at least the portion of the filtration media, the support frame comprising a wall portion and at least one media engagement element spaced from the wall portion and arranged in supporting contact with and proximal to the edge of the filtration media on a first side of the filtration media; and a hold down frame having a length and extending along at least the portion of the filtration media, the hold down frame comprising a wall portion and at least one media engagement element spaced from the wall portion and arranged in supporting contact with and proximal to the edge of the filtration media on a second side of the filtration media, wherein the support frame and hold down frame are interactively assembled together to provide the frame assembly along at least a portion of the edge of the filtration media with the media engagement elements of the support frame interacting with the media engagement elements of the hold down frame to support the filtration media inbetween by contacting the filtration media at its first and second sides, and the wall portion of one of the support frame and the hold down frame is positioned between the media engagement element and wall portion of the other.

In accordance with yet another aspect of the present invention, the above advantages are achieved by a filter product comprising filtration media and a frame assembly provided along at least a portion of an edge of the filtration media, the filter product having an input face and an output face of the filtration media for permitting carrier fluid to pass therethrough while removing a filtrate component, the frame assembly comprising a support frame having a length and extending along at least the portion of the filtration media, the support frame comprising at least one media engagement element arranged in supporting contact with and proximal to the edge of the filtration media on a first side of the filtration media; and a hold down frame having a length and extending along at least the portion of the filtration media, the hold down frame comprising at least one media engagement element arranged in supporting contact with and proximal to the edge of the filtration media on a second side of the filtration media, wherein the support frame and hold down frame are interactively assembled together to provide the frame assembly along at least a portion of the edge of the filtration media with the media engagement elements of the support frame interacting with the media engagement elements of the hold down frame to support the filtration media inbetween by contacting the filtration media at its first and second sides, and at least one of the support frame and the hold down frame further includes a wall portion spaced from its media engagement element with its media engagement element angled away from the side wall.

BRIEF DESCRIPTION OF THE DRAWINGS

FIG. 7 is an enlarged partial view of the right side end wall interconnection as illustrated in FIG. 4 showing in greater detail an end wall hold down feature of the hold down frame and an end wall support feature of the support frame with an end portion of the filtration media in between;

DETAILED DESCRIPTION OF THE PREFERRED EMBODIMENTS

Figure 1:
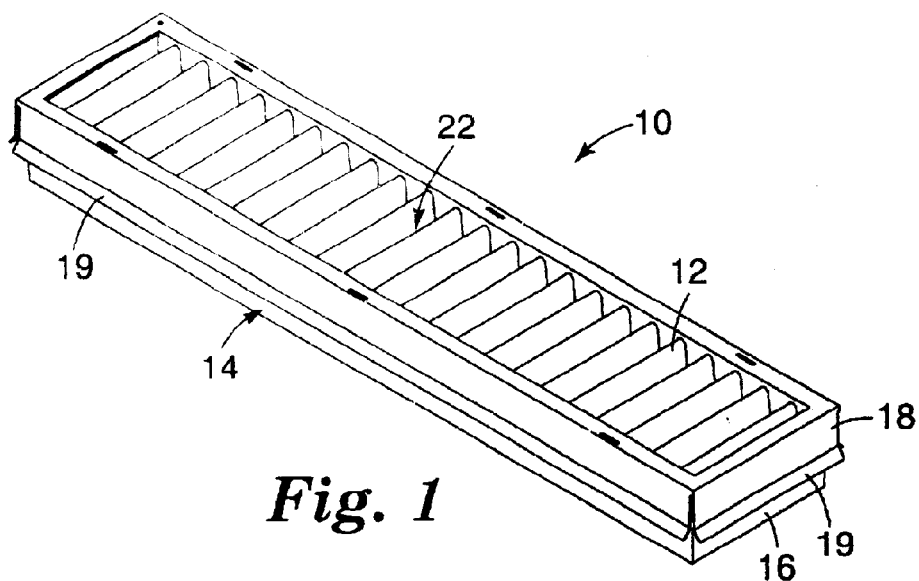
FIG. 1 is a perspective view of a filter product in accordance with the present invention having multiple frame components combined with a quantity of filtration media, the frame comprising a support frame and a hold down frame that cooperate to support and preferably at least slightly compress filtration media to provide the filter product with an input face and an output face and for use in filtering a filtrate from a carrier medium, such as air.
Figure 2:
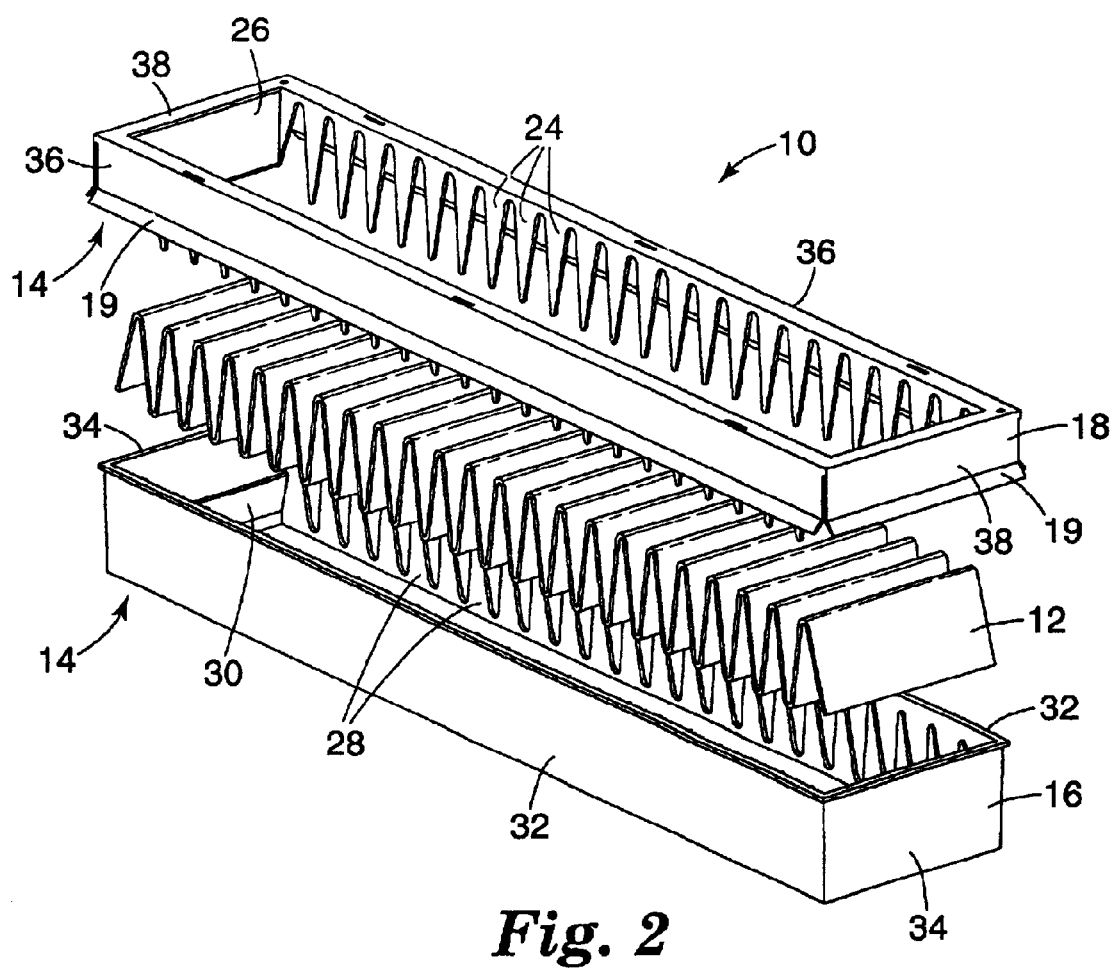
FIG. 2 is an exploded perspective view of the filter product of the FIG. 1 illustrating the hold down frame separated from a pleated filtration media, both of which are also illustrated separated from the support frame, each of the support frame and hold down frame including filtration media support features that cooperate to position the filtration media in position by engagement with the filtration media along and proximal to its side edges.
Figure 3:
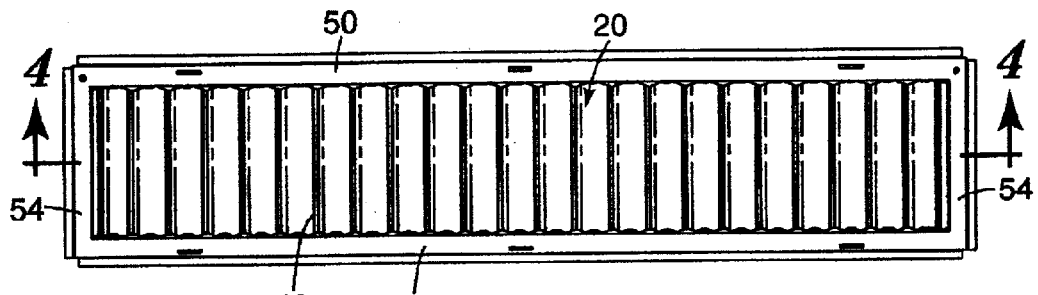
FIG. 3 is a top plan view of the filter product of the FIG. 1 showing the hold down frame provided to surround and partially extend over the perimeter of a rectangular quantity of pleated filtration media.

With reference to the attached drawings, wherein like components are labeled with like numerals throughout the several figures, and initially to FIGS. 1 and 2, a filter product 10 is provided in accordance with the present invention including a shaped quantity of filtration media 12 combined with a frame 14 having multiple frame components. As illustrated, the filtration media 12 comprises a pleated filtration media formed in the general shape of a rectangle. It is understood that the present invention is also applicable to any shape of the filtration media 12 whether or not the filtration media 12 comprises pleated media or otherwise. The present invention is, however, particularly applicable where one or more of the multiple frame components provide support aspects to the filtration media 12, as will be better understood based upon the description below.

Is preferable that frame 14 substantially surround the filtration media 12 along its peripheral edges. It is contemplated, however, that such a frame may only partially surround the filtration media 12. Moreover, depending on the peripheral shape defined by the filtration media 12, the frame may or may not contact one or more portions of the peripheral edge of the filtration media 12. As above, the present invention finds particular applicability where pleated filtration media is used, so it is preferable that the frame provide support in maintaining pleat spacing and orientation proximal to at least one side edge of the pleated filtration media.

Frame 14 comprises multiple components including a support frame 16 and a hold down frame 18. Preferably, both the support frame 16 and hold down frame 18 surround the filtration media 12 and fit together to create a peripheral frame 14 about the filtration media 12. As a result, the filter product 10 exhibits an input filter face 20 and an output filter face 22 as the major surfaces of the overall generally planar quantity of filtration media 12. Thus, with the filter product 10 supported in position according to a particular application, a fluid flow of carrier fluid and filtrate can be directed to the input face 20 so that the filtrate is removed leaving the carrier fluid to pass from the output face 22. As shown, the filter product 10 is designed to fit into a housing (not shown) that may be designed for any application, which housing conventionally would include surfaces (not shown) against which the outer edges of the hold down frame 18 would engage. As such, it is preferable to set up the input and output faces 20 and 22, respectively, so that the fluid dynamics of any given application would tend to keep the filter product 10 in its proper position.

According to a preferred embodiment, a peripheral gasket 19 preferably extends along the periphery of the hold down frame 18, the construction of which is described in greater detail below. As shown, fluid flow through the filter product 10 from input face 20 to output face 22 would tend to cause the gasket 19 to flare outward against the application specific housing surfaces (not shown) to thus enhance the gasket's 19 seal against the housing (not shown). Furthermore, it is contemplated that the frame 14 may include any features or assume any shape (whether the same or different from the peripheral edge shape of the filtration media 12) in order to accommodate mounting or supported of the filter product 10 in a location based upon any specific application. The gasket 19 as it is flared from the hold down frame 18 also provides for easier gripping of the hold down frame 18 for removing the hold down frame 18 from the support frame 16 (including releasing the snap lock feature described below) as well as for aligning the hold down frame 18 onto the support frame 16 during assembly where the flared gasket acts to funnel the frames together.

The following description of further components of the support frame 16 and the hold down frame 18 are based upon the specific illustration wherein the filtration media 12 comprises a pleated filtration media. Where the filtration media 12 assumes different shapes or features defining its overall major services, is understood that similar concepts and features as described below are applicable in a similar way. For example, in supporting the filtration media 12, support features may assume the shape of any filtration media shape or portion thereof, even if the filtration media is completely flat, in accordance with the present invention.

The present invention also finds particular applicability to situations where the filtration media includes particulate material, as a component, sublayer or additive. A problem with filtration media including particulate material is the possibility of shedding of the particulate material from the filtration media, which shed particulate material may potentially contaminate the clean carrier fluid flow. A common material that is often incorporated within filtration media is particulate carbon. Conventionally, filtration media including particulate carbon are known to be provided as carbon pleat packs that comprise a layer of particulate carbon provided between layers of polymeric filtration media that filter and retain the carbon. Such polymeric filtration media materials are well known and may be made as a nonwoven with microfibers, continuous filaments, and the like or as a woven material with any fiber and weave construction. Otherwise, such particulate carbon may be interspersed within the thickness of such woven or non-woven webs as a particulate loaded web or may be held within the structure of open cell materials or the like. Specific examples of suitable particulate carbon media that can be pleated are described in the U.S. Pat. No. 3,971,373, the entire disclosure of which is hereby incorporated by reference.

According to the present invention, it is desirable to provide support features of the support frame 16 and hold down frame 18 so that the filtration media 12 is supported in accordance with its desired shape spacing and orientation. It is also preferable that the filtration media 12 be snugly held between the support frame 16 and hold down frame 18 so that the filtration media 12 is properly held in place while effectively sealing the edges of the filtration media 12 to the frame 14 so that all the supplied carrier fluid with filtrate passes through the filtration media 12 without significant leakage around the edges of the filtration media 12. That is to say, it is even more preferable to at least slightly compress the filtration media 12 between the support features of the support frame 16 and hold down frame 18, the advantages of which will be further discussed below. Thus, instead of using a sealant, such as adhesive and the like, at the interface between the filtration media edges and the frame, the frame 14 preferably includes features that effectively pinch the filtration media proximal to its edges. That way, significant leakage is effectively prevented. Where the filtration media 12 comprises particulate matter as described above, pinching and thus compressing the filtration media proximal to at least certain of the media edges also effectively minimizes loss of the particulate matter from the filtration media 12.

In order to accomplish these goals, the support frame 16 and hold down frame 18 are preferably provided with cooperating filtration media support features that engage, and more preferably pinch and compress, the filtration media proximal to and along at least a portion of at least one of its edges, and preferably, substantially completely about the filtration media's perimeter. Specifically, hold down frame 18 preferably includes side media engagement elements 24 and end media engagement elements 26. Support frame 16 preferably includes side media engagement elements 28 and end media engagement elements 30. Together, these features preferably extend substantially completely around the filtration media 12.

Specifically, support frame 16 preferably comprises a pair of spaced sidewalls 32 connected together by end walls 34, which according to the illustrated embodiment create a rectangular support frame 16 similar in shape to the shape defined by the periphery of the pleated filtration media 12. Hold down frame 18 preferably, in a similar way, comprises a pair of spaced side gasket walls 36 connected together by end gasket walls 38, which again according to the illustrated embodiment create a rectangular hold down frame 18 similar in shape to the shape defined by the periphery of the pleated filtration media 12. As noted above, a gasket 19 is thus preferably created by flared portions of each of side gasket walls 36 and end gasket walls 38 that advantageously together provide the peripheral gasket 19 for abutment with an application housing (not shown) as an integral feature of the hold down frame 18. Gasket 19, as made up by the plural portions thereof, also adds, by virtue of its flared structure, structural integrity to the hold down frame 18 even though the portions themselves or the entire side and end gasket walls 36 and 38 may be made to be more flexible (i.e. thinner or of more flexible material). It is preferable that the gasket 19 portions be sufficiently flexible and size so as to facilitate effective sealing with such an application housing (not shown).

Figure 6:
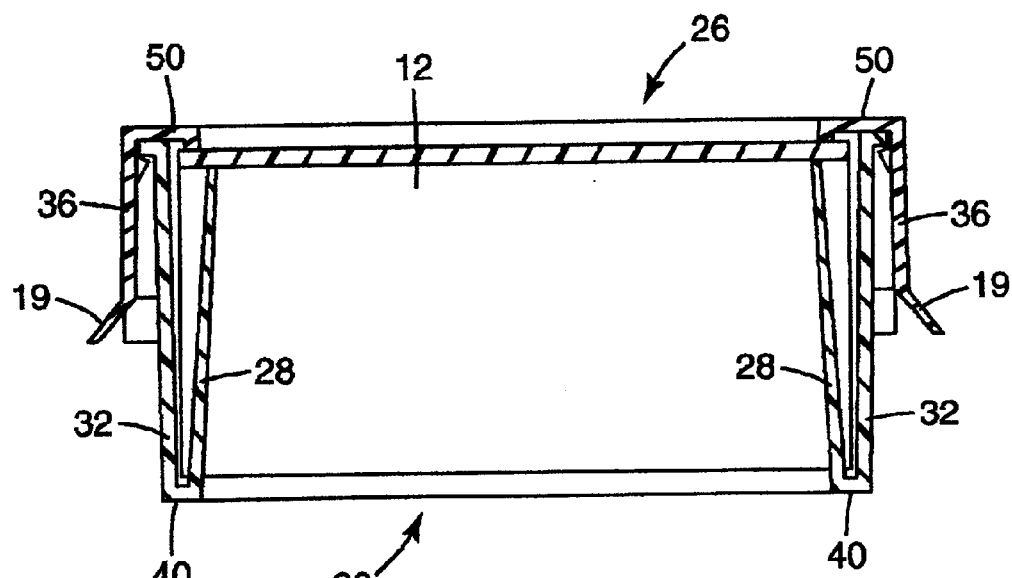
FIG. 6 is a cross-sectional view taken along line 6—6 of FIG. 5 showing the interrelated support frame sidewall and the hold down frame gasket wall and filtration media support features of the support frame and hold down frame, respectively, as they are interconnected by a snap feature to support the filtration media in position and to define a particulate channel.
Figure 7:
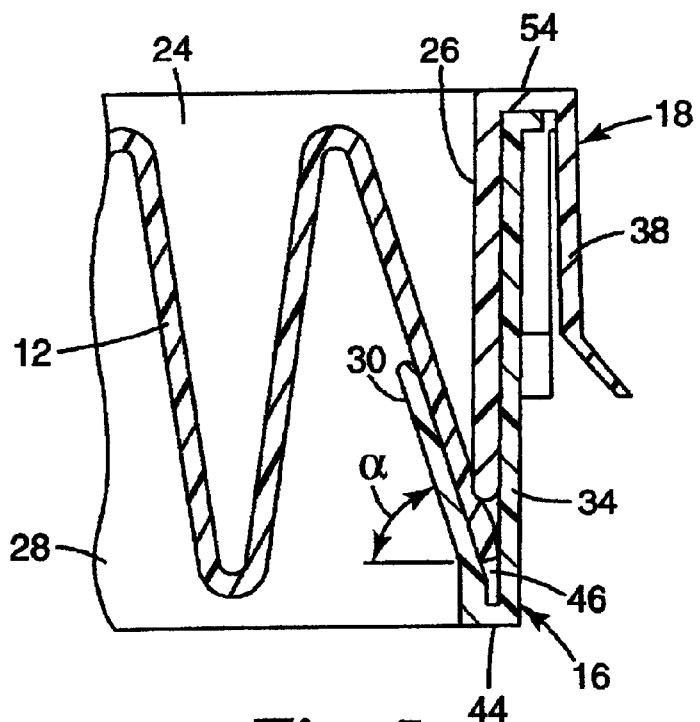
Figure 8:
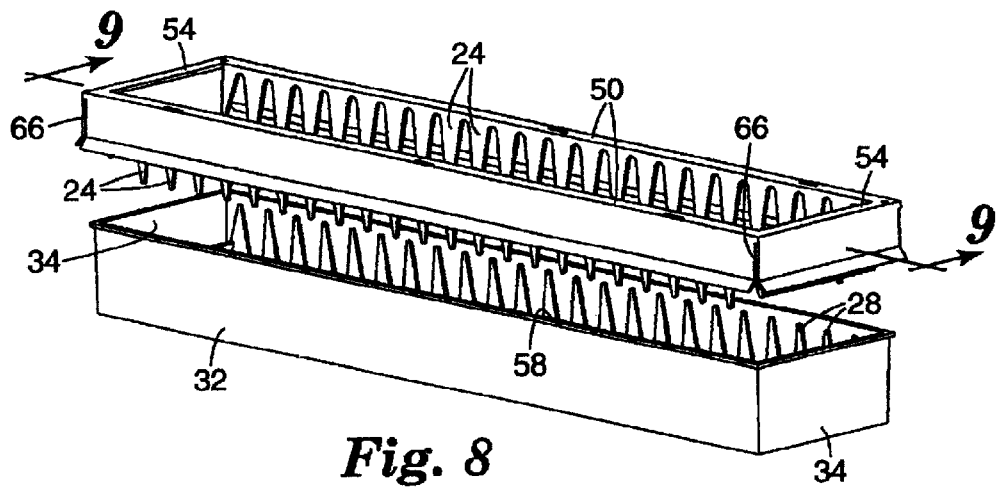
FIG. 8 is a perspective view similar to FIG. 2, but showing a hold down frame and a support frame separated from one another without the filtration media illustrated.
Figure 9:
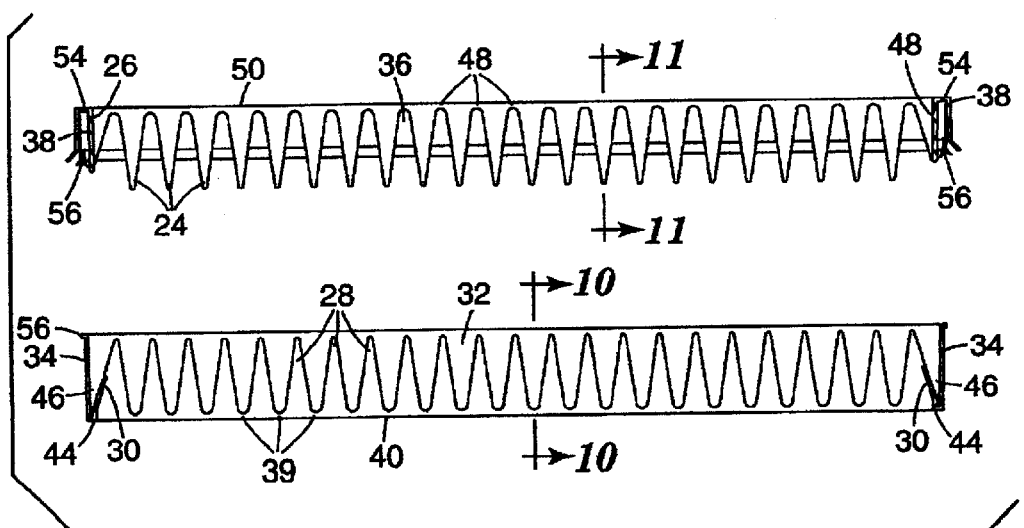
FIG. 9 is an enlarged cross-sectional view taken along line 9—9 of FIG. 8 showing the upper hold down frame separated from the lower support frame from a side view.
Figure 10:
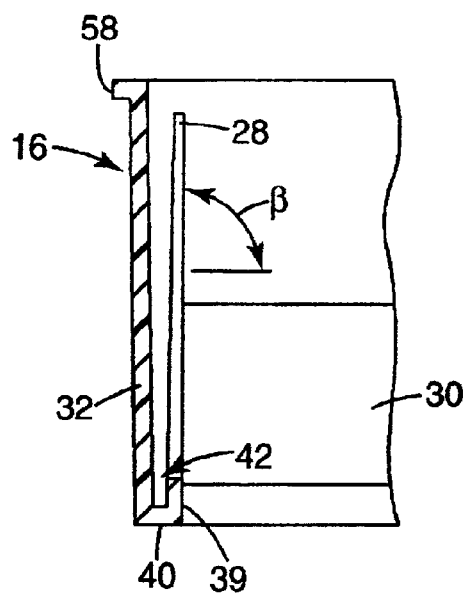
FIG. 10 is an enlarged cross-sectional view taken along line 10—10 of FIG. 9 showing the side view of a media engagement element and the cross-section of a side wall of the support frame.
Figure 11:
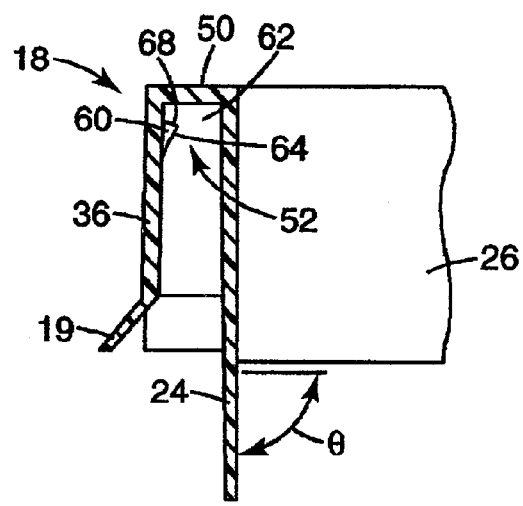
FIG. 11 is an enlarged cross-sectional view taken along line 11—11 of FIG. 9 showing the cross-section of a media engagement element of the hold down frame and of the gasket wall thereof.

FIGS. 8 and 9 illustrate the support frame 16 and hold down frame 18 separated from one another without the filtration media 12 illustrated. FIGS. 10 and 11 show the respective features of the sidewalls 32 and side gasket walls 36 of the support frame 16 and the hold down frame 18. FIG. 6 illustrates the interrelationship of the sidewalls 32 and side gasket walls 36 along with the pleated filtration media 12. The features and interrelationship of the end walls 34 of support frame 16 and the end gasket walls 38 of hold down frame 18 are illustrated best in FIG. 7 along with the pleated filtration media 12.

Support frame 16 includes a plurality of the side media engagement elements 28, preferably sized and of a number so that the side media engagement elements 28 extend substantially completely along the length of sidewall 32. That is, the cumulative length covered by the side media engagement elements 28 preferably is substantially the same as the length of sidewall 32. In the case of providing support, including spacing and orientation, for pleated filtration media 12, each side media engagement elements 28 is preferably shaped to be triangular or toothlike in order to follow the filtration media 12 proximal to its edge surface. The combination of side media engagement elements 28 form a toothed rack that is similar to the shape of the pleated filtration media 12 proximal to its edge.

The side media engagement elements 28 are preferably formed integral with one another, and more preferably formed integral with the sidewall 32. For interconnecting one side engagement element 28 with another (i.e. at the troughs between the peaks formed by elements 28), interconnect portions 39 are also preferably provided. A bottom wall portion 40 is provided in order to interconnect the plural side media engagement elements 28 and interconnect portions 39 with sidewall 32. The bottom wall portion 40 preferably extends substantially completely along the sidewall 32 to provide interconnection with each of the side media engagement elements 28. As shown in FIG. 10, a channel 42 is formed between the sidewall 32 and the series of side engagement elements 28, which channel 42 is closed at the bottom by bottom wall portion 40. The width of channel 42 is determined by the spacing between the series of side media engagement elements 28 and the sidewall 32 while its depth is minimally defined by the extent that the interconnect portions 39 extend from the bottom wall portion 40. This channel 42 advantageously provides an enclosed volume capable of holding particulate matter that may shed from a particulate containing filtration media, if used, during assembly or use of the filter product 10. In the assembled state of the filter product 10 comprising the interaction of the support frame 16, the hold down frame 18 and the filtration media 12, this volume is preferably substantially closed by the filtration media 12 provided above the channel 42 for containing any shed particulate matter. Preferably, each sidewall 32 of the support frame 16 is similarly constructed based upon the design of the filtration media 12 with the side media engagement elements 28 of respective sidewalls 32 opposed to one another, and preferably in synchronization to one another.

The end walls 34 each preferably include an end media engagement element 30 as shown in FIGS. 7 and 9. The end media engagement element 30 is preferably oriented and angled inwardly as compared to end wall 34 to define an angle of α from horizontal that is preferably between 30 and 80 degrees. The end media engagement element 30 also preferably extends substantially entirely over the transverse width of end wall 34 and is interconnected therewith by another bottom wall portion 44. Like sidewalls 32, each end wall 34 is preferably similarly constructed with the end media engagement elements 30 opposed to one another. However, differently than the side media engagement elements 28, a single end media engagement element 30 can be provided at each end wall 34 since its purpose is to engage the filtration media 12 proximal to its end edge. End media engagement element 30 may, however, be provided in other ways, such as formed of multiple pieces. Also, a channel 46 is created between each end media engagement element 30 and its respective end wall 34, similar to channel 40, with the width of channel 46 being based upon the distance that the bottom wall portion 44 extends between the end media engagement element 30 and its connected sidewall 34. Channel 46 also facilitates variable end lengths of the filtration media 12. It is further preferable that the bottom wall portions 40 and 44 of each respective sidewall 32 and end wall 34 form a continuous bottom wall that extends about the peripheral edge of the support frame 16 leaving the remainder of the area defined internal thereto as open to permit fluid flow through the filter product 10. Likewise, it is preferable that the side media engagement elements 28, as interconnected by portions 39, extend in a continuous manner with the end media engagement elements 30 so as to create a substantially continuous channel including channel portions 42 and channel portions 46 in series, respectively. As shown in FIGS. 7 and 9, the side edge of the end media engagement element 30 can be connected along the sloped edge of the last side media engagement element 28 that is closest to each end wall 34.

Hold down frame 18 also includes side media engagement elements 24, that are preferably sized and of a number so that the side media engagement elements 24 extend substantially completely along the length of side gasket wall 36, as shown in FIG. 9. That is, the cumulative length covered by the side media engagement elements 24 preferably is substantially the same as the length of sidewall 36. In the case of providing support and compression, including spacing and orientation, for pleated filtration media 12, each side media engagement element 24 is preferably shaped to be triangular or toothlike in order to follow the pleated filtration media 12 proximal to its edge surface. The combination of side media engagement elements 24 form a toothed rack that is similar to the shape of the pleated filtration media 12 proximal to its edge.

The side media engagement elements 24 are preferably formed integral with one another, and more preferably formed integral with the side gasket wall 36. For interconnecting one side media engagement element 24 with another (i.e. at the troughs between the peaks formed by elements 28), interconnect portions 48 are also preferably provided. A top wall portion 50 is provided in order to interconnect the plural side media engagement elements 24 and interconnect portions 48 with side gasket wall 36. The top wall portion 50 preferably extends substantially completely along the sidewall 36 to provide interconnection with each of the side media engagement elements 24. As shown in FIG. 11, a channel 52 is formed between the sidewall 36 and the series of side engagement elements 24, which channel 52 is closed at the top by top wall portion 50. The width of channel 52 is determined by the spacing between the series of side engagement elements 24 and the sidewall 36 while its depth is defined by the extent that the interconnecting portions 48 project downward from the top wall portion 50. This channel 52 also, depending on the orientation of the filter product 10 can advantageously provide an enclosed volume capable of holding particulate matter that may accidentally dislodge or shed from a particulate containing filtration media, if used, during assembly or use of the filter product 10. As above, when the support frame 16 and hold down frame 18 are assembled with the filtration media 12 in place, it is preferable that the filtration media 12, as it follows the side media engagement elements 24, substantially closes the volume between the filtration media 12 and the channel 52. Preferably, each side gasket wall 36 of the hold down frame 18 is similarly constructed based upon the design of the filtration media 12 with the side media engagement elements 24 of respective side gasket walls 36 opposed to one another, and preferably in synchronization to one another.

The end gasket walls 38 each preferably include an end media engagement element 26 as shown in FIGS. 7 and 9. The end media engagement element 26 is preferably oriented and directed substantially parallel to the end gasket wall 38 (as viewed in FIGS. 7 and 9), although it may be angled as compared to end gasket wall 38 to define an angle from horizontal. The end media engagement element 26 also preferably extends substantially entirely over the transverse width of end gasket wall 38 and is interconnected therewith by another top wall portion 54. Like side gasket walls 36, each end gasket wall 38 is preferably similarly constructed with the end media engagement elements 26 opposed to one another. However, differently than the side media engagement elements 24, a single end media engagement element 26 can be provided at each end gasket wall 38 since its purpose is to engage the filtration media 12 proximal to an end of the pleated filtration media 12. End media engagement element 26 may, however, be provided in other ways, such as formed of multiple pieces. Also, a channel 56 is created between each end media engagement element 26 and its respective end gasket wall 38, similar to channel 52, the width of channel 56 being based upon the distance that the top wall portion 54 extends between the end media engagement element 26 and its connected side gasket wall 38. Is further preferable that the top wall portions 50 and 54 of each respective side gasket wall 36 and end gasket wall 38 form a continuous top wall that extends about the peripheral edge of the hold down frame 18 leaving the remainder of the area defined internal thereto as open to permit fluid flow through the filter product 10. Likewise, it is preferable that the side media engagement elements 24, as interconnected by portions 48, extend continuously with the end media engagement elements 26 so as to create a substantially continuous channel including channel portions 52 and channel portions 56 in series, respectively. As shown in FIGS. 7 and 9, the side edges of the end media engagement elements 26 can be connected to the last side media engagement element 24 at each end of side gasket wall 36. As illustrated in FIG. 7, the connection point depends on the desired positioning of the end media engagement elements 26 with respect to the ends of the filtration media 12. As also shown in FIG. 7 it is preferable that the end media engagement elements 26 create a pinch zone between its end and a surface of the end media engagement elements 30 of the support frame 18 between which the filtration media 12 can extend. More preferably, the end edges of the filtration media 12 extend beyond the pinch zones and along the end media engagement elements 30 toward channels 46.

Also, the peripheral channel extending along the hold down frame 18, as provided by the series of the channel portions 52 and 56, accommodates a telescoping type arrangement and fit between the support frame 16 and the hold down frame 18. Specifically, the upper portion of sidewalls 32 and end walls 34 of the support frame 16 fit within the respective channel portions 52 and 56 of the hold down frame 18 so as to be positioned between the series of side media engagement elements 24 and end media engagement elements 26 and the combination of side gasket walls 36 and end gasket walls 38 of the hold down frame 18. Thus, it is possible to position the support frame 16 nested with the hold down frame 18 so that the side media engagement elements 28 and 24, respectively, and the end media engagement elements 30 and 26, respectively, can effectively mesh with one another in accordance with the pleated structure of the filtration media 12. In accordance with the present invention, it is contemplated that such cooperating or meshing features may be provided out of a number of different shapes based upon the filtration media to be utilized, including even the possibility of a flat media having cooperating flat features. It is preferable that such features provide substantially continuous contact with the filtration media along its edges.

By the construction wherein the sidewalls 32 and end walls 34 of the support frame 16 fit within the top channels 52 and 56, respectively, of the hold down frame 18, the inside surfaces of the top wall portions 50 and 54 abut the top edges of the sidewalls 32 and end walls 34, respectively, to limit the telescoping effect of the support frame 16 and hold down frame 18. Importantly, this limit also sets the spacing between the side media engagement elements 28 and the side media engagement elements 24 as well as the spacing between the end media engagement elements 30 and the end media engagement elements 26. Preferably, the spacing is substantially even throughout and of a degree to accommodate the filtration media 12. More preferably, the spacing not only permits substantially continuous contact between the various engagement elements and the filtration media 12 proximal to its edges, but also pinches and thus compresses the filtration media 12 proximal to its entire peripheral edge. As can be determined based upon the known thickness of a specific filtration media 12 and the dimensions of the above components, the spacing including any desired level of compression can be effectively defined.

Figure 4:
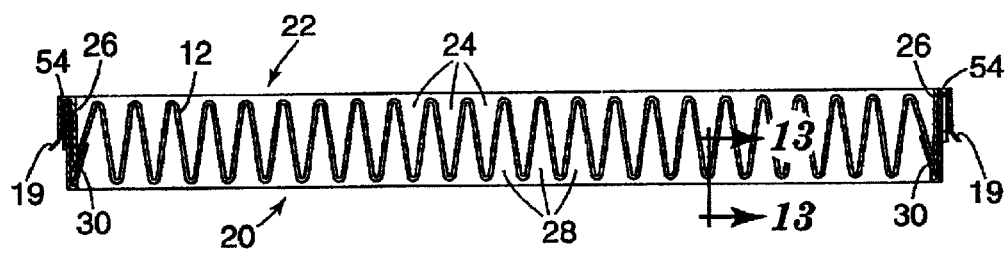
FIG. 4 is a cross-sectional view taken along line 4—4 of FIG. 3 showing the cooperating end walls of the support frame and hold down frame as well as the pleated shape defined by the cooperating filter media support features thereof.
Figure 5:
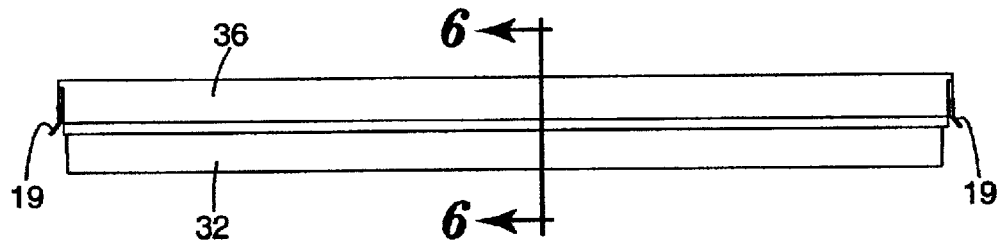
FIG. 5 is a side view of the filter product as illustrated in FIGS. 1 and 3 showing the hold down frame gasket wall covering an upper portion of the support frame sidewall.

As illustrated in FIG. 4, the side media engagement elements 24 and 28 define a gap between them extending over the series of side media engagement elements 24 and 28 and interconnect portions 48 and 39, respectively, where the peaks of the support frame 16 preferably fit within the troughs of the hold down frame 18, and vice versa. The gap is preferably substantially even throughout so as to evenly hold the filtration media 12 along the total gap length, but variations can be advantageously accommodated by the present invention, in particular by angling one or more of the side media engagement elements 24 and/or 28, as described below. In any case, it is preferable to adequately hold the filtration media 12 proximal to its side edges within the gap defined between the series of side media engagement elements 24 and 28.

Moreover, it is an advantageous aspect of the present invention in that the side media engagement elements 24 and 28, as arranged together, support and preferably compress the filtration media along the filtration media 12 in substantial line contact at a point spaced inward from the filtration media 12 edges. It is contemplated that only occasional compression points may be used along the gap instead.

Figure 13:
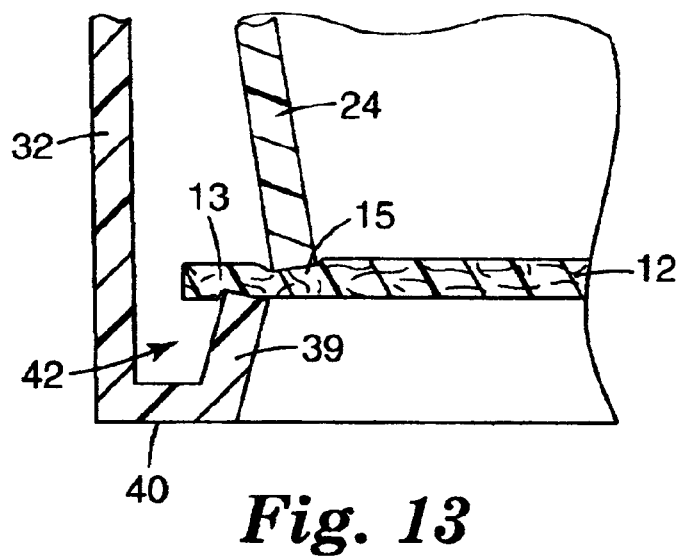
FIG. 13 is an enlarged taken along line 13—13 of FIG. 4 with the cross-section taken through the peak of a side media engagement element of the hold down frame as positioned within a trough between peaks of the side media engagement elements of the support frame to show the filtration media extending through and preferably compressed between side media engagement elements as spaced from the support frame side wall.

As shown in FIG. 13, the filtration media 12 preferably extends within the volume defined by channel 42, the extension portion 13 of the filtration media 12 acting to close that volume as noted above. Preferably, the extension portion 13 is at least twice the thickness of the filtration media 12 so as to space the compression zone 15 of the filtration media 12 from the side edge of the filtration media 12. Advantageously, this arrangement accommodates greater variations in the dimensions of the filtration media 12 and ensures good side support of the filtration media 12. The same is true of the end edges of the filtration media 12 as they can extend beyond their compression points, as described elsewhere. Also, by spacing the compression zone 15 inward from the side edge of the filtration media 12, any pillowing effect that may occur as caused by the compression zone can be contained within the filtration media 12. Thus, even if there is some crushing or displacement of the filtration media 12 itself, or in particular, any particulate material such as carbon that may be interspersed within or provided as a layer within the filtration media 12, the spacing of the compression zone 15 inward will minimize shedding of the particulate material from the edge of the filtration media 12. In contrast, gripping at the media edge can crush or dislodge any particulate material and permit it to shed from the side edge. Moreover, shedding from the edge may also compromise the holding power of the frame system by reducing the thickness of the media at its edge, thus rendering the side edge more loosely supported. By the present invention, good compressive support is achieved even where the filtration media 12 is compressed, and possibly somewhat crushed, at a point spaced from but proximal to the side edge of the filtration media 12.

Also, it is preferable that the support frame 16 and hold down frame 18 are releasably locked to one another when in the assembled state as defined by the aforementioned limit position. However, the support frame 16 may instead be permanently assembled with the hold down frame 18. Such a permanent assembly can utilize any conventional or developed bonding or connecting technique including, as non-limiting examples, ultrasonic bonding, heat staking, adhesives, and mechanical fasteners. Releasable lock techniques may comprise, as non-limiting examples, mechanical interference-type locks, such as snap elements, hook and loop connectors, and the like, as well as releasable adhesives, magnetically interactive elements and the like.

A preferred manner of holding the support frame 16 to the hold down frame 18 comprises a releasable snap lock system. Specifically, the support frame 16 preferably further comprises a peripheral lock flange 58. The lock flange 58 may extend entirely around the upper periphery of the support frame 16 or it may be provided in one or more segments, as needed to function in the releasable snap lock system. The lock flange 58, or any segments thereof, add structural strength to the to the support frame 16 that may advantageously permit the use of thinner materials in making the support frame 16 with such reinforcement.

Within the one or both of channels 52 and/or 56 of the hold down frame 18, any number of lock protrusions 60 can be provided, such as illustrated in FIG. 11 extending from the inner surface of side gasket wall 36 within channel 52. Preferably, such lock protrusions 60 are provided at evenly spaced locations within both channel portions 52. Each lock protrusion 60 defines a receiving space 62 that is sized and shaped to permit the lock flange 58 to fit therein when the support frame 16 and hold down frame 18 are fully assembled. Each protrusion 60 also preferably comprises a cam surface 64 that facilitates passing of the peripheral lock flange 58 past the lock protrusions 60 to fit within the lock space 62 above each.

In order to accommodate an easy snap fit and permit easy unlocking of the hold down frame 18 from the support frame 16, it is desirable to introduce greater flexibility within the interaction of the cam surfaces 64 and the lock flange 58. One way of doing this is illustrated best in FIG. 8, wherein flexibility slits 66 are cut or formed at the corners of the hold down frame 18 substantially dividing the side gasket walls 36 from the end gasket walls 38. The slits 66 introduce greater flexibility in that the lock protrusions 60 become more easily displaceable away from the side media engagement elements 24, thereby permitting the peripheral lock flange 58 to more easily pass by the lock protrusions 60. As the peripheral lock flange 58 is inserted within the channels 52, the peripheral lock flange 58 contacts each cam surface 64 to force the lock protrusions 60 and thus the side gasket walls 36 outwardly to provide additional clearance. Thereafter, when the peripheral lock flange 58 is fully positioned within the space 62, the resilient nature of the side gasket walls 36 will urge the lock protrusions 60 back in toward the side media engagement elements 24 and to lock under the peripheral lock flange 58. Furthermore, it is preferable that the lock surface 68 of each lock protrusion 60 be slightly sloped downward from the inside surface of the side gasket walls 36 to facilitate easier locking and unlocking. Sloped surface 68 is also advantageous in that it provides for a compensating feature that accommodates variations in filtration media 12 thickness. That is, the slope permits the peripheral lock flange 58 to lock in place even where it will not fully fit within the space 62 because the filtration media 12 limits full telescoping insertion thereof. For example, where the filtration media is a little thicker than planned, the slope of the surface 68 permits locking with the peripheral lock flange 58 because the slope in effect increases the opening into space 62.

According to a preferred embodiment, the side media engagement elements 24 of the hold down frame 18 and the side media engagement elements 28 of the support frame 16 are angled slightly away from the sidewalls 36 and 32, respectively. Specifically, as shown in FIG. 10, the side media engagement elements 28 may be angled at an angle β that is less than 90 degrees from horizontal, as shown. Likewise, as shown in FIG. 11, the side media engagement elements 24 may be angled at an angle θ that is less than 90 degrees from horizontal, as shown.

Figure 12:
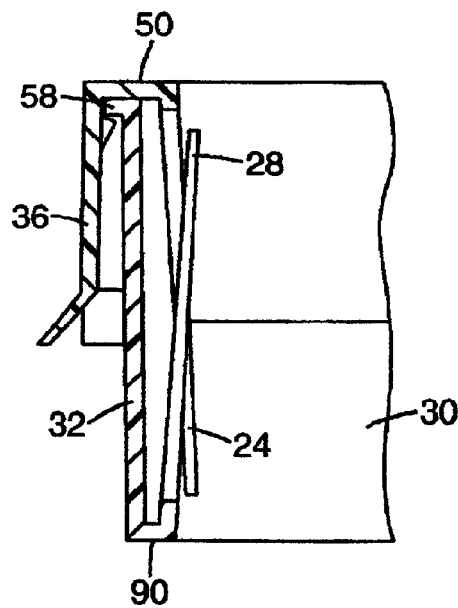
FIG. 12 is a view of the support frame and hold down frames assembled with media engagement elements intermeshed together, but without the filtration media between them for purposes of illustration.

As shown in FIG. 12, the side media engagement elements 24 and 28 can both be angled inwardly away from the assembly of sidewalls 32 and side gasket walls 36. Note that FIG. 12 shows the assembled support frame 16 and hold down frame 18 without filtration media 12 provided for illustration purposes. It has been discovered that by providing the side media engagement elements 24 and 28 at an angle of at least 5° from parallel with sidewalls 36 and 32, greater flexibility is introduced within the assembly for pinching and compressing the filtration media 12 in its supported position more effectively. That is, flexibility is introduced in that each media engagement element 24 and each media engagement element 28 can independently flex inwardly (which inward movement is facilitated by the slight angle) as a result of the movement of the support frame 16 within the channels 52 and 56 of the hold down frame 18. Thus, if one or more portions of the filtration media 12 at its edges is denser, thicker or less compressible for any reason, the media engagement elements 24 and 28 that are affected thereby will flex to thus permit other pairs of the media engagement elements 24 and 28 to continue to approach one another. Effectively, a better continuous filtration media pinching and sealing proximal to the edges of the filtration media 12 is achieved. Also, the flexing between intermeshing pair of media engagement elements minimize any damage to the filtration media 12 itself that could otherwise result from a crushing force. Moreover, the angled end media engagement elements 30 act similarly as the end media engagement elements 26 are moved toward them with the filtration media 12 between them. It is further contemplated that features may be incorporated within either of the end media engagement elements 26 or 30 to further facilitate or increase flexibility.

It is further contemplated to utilize the frame assembly of the present invention to also support other media in combination with that described and suggested above. For example, frame assemblies in accordance with the present invention may be combined together in a side-by-side or other related pattern or may be stacked depending on a specific application. Moreover, it is contemplated to support plural filtration media, same or different from one another, by a single or modified frame assembly. That is, multiple layers of filtration media can be stacked together within the frame support structure, which media can be similarly supported (such as layers of pleated material), or they may include dissimilar features or configurations.

Figure 14:
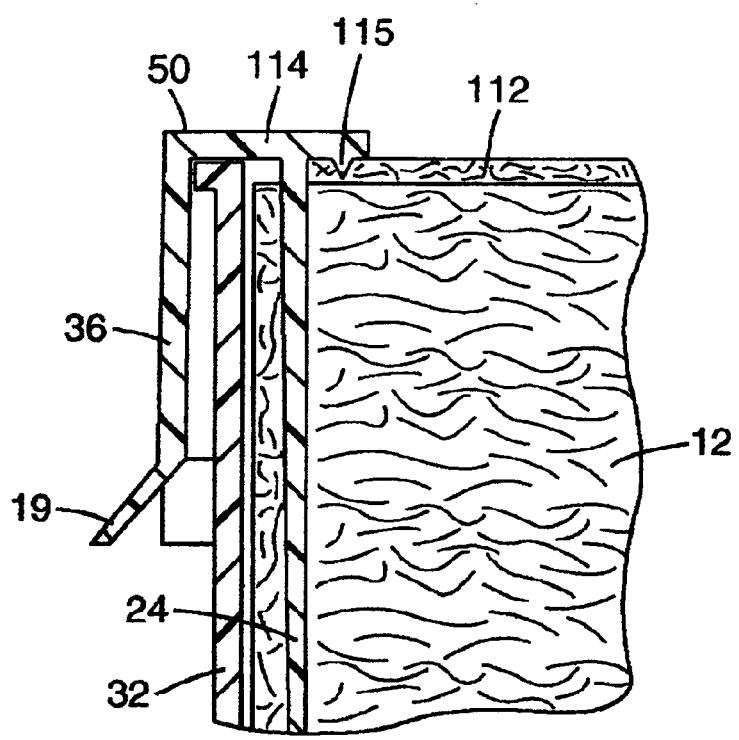
FIG. 14 is an enlarged partial cross-sectional view of the side of the hold down frame as supporting the filtration media and an additional filtration media layer.

As a further example, FIG. 14 shows the pleated filtration media 12, described above, in combination with another media layer 112. The media layer 112 can be supported between the peaks of the pleats of filtration media 12 and a hold down frame extension flange 114. Such an extension flange 114 may extend from the top surface 50 and/or the top surface 54 of the hold down frame 18 as a perimetric flange (i.e. all the way around), or only at one or more select locations. One or more extension flanges 114 preferably can extend inward and over the media 112 to hold it in place along with the filtration media 12. It is contemplated that such extension flange(s) may be otherwise provided at a level lower that the top surfaces 50 and/or 54 and that other such elements may be utilized to support a media layer without support from the filtration media 12. Also, grip enhancement features such as angled teeth 115 can extend downward and possibly inward or otherwise to enhance holding the media 112 in proper position. Such additional media may supplement the filtering affect of the filter product 10 by screening for different size particles, for example, where the media 112 would be more easily replaceable, or may supplement the filtering by adding another filtering concept, e.g. to remove odors versus particulate matter.

What is claimed is:

1. A filter product comprising filtration media and a frame assembly provided along at least a portion of the filtration media, the filter product having an input face and an output face of the filtration media for permitting carrier fluid to pass therethrough while removing a filtrate component, the frame assembly comprising:

a support frame having at least one side frame component and at least one end frame component with each side frame component having a length and extending along at least the portion of the filtration media, the support frame side frame component comprising a plurality of media engagement elements arranged in series and in supporting contact with and proximal to an edge of the filtration media on a first side of the filtration media; and a hold down frame having at least one side frame component and at least one end frame component with each side frame component having a length and extending along at least the portion of the filtration media, the hold down frame side frame component comprising a plurality of media engagement elements arranged in series and in supporting contact with and proximal to the edge of the filtration media on a second side of the filtration media;

wherein the support frame and hold down frame are interactively assembled together to provide the frame assembly proximal to at least a portion of the edge of the filtration media with the media engagement elements of the support frame interacting with the media engagement elements of the hold down frame to support the filtration media in between by contacting the filtration media at its first and second sides, and at least one of the support frame and the hold down frame further includes a wall portion spaced from its media engagement elements so as to define a channel positioned to run along the portion of the edge of the filtration media wherein the media engagement elements of either the support frame or the hold down frame extend at an angle away from the sidewall on each frame side component.

2. The filter product of claim 1, wherein the filtration media is positioned within a compression zone between the media engagement elements of the support frame and the hold down frame and further extends beyond the compression zone toward the wall portion that is spaced from the media engagement elements.

3. The filter product of claim 2, wherein the filtration media extends toward the wall portion by a distance at least equal to twice the thickness of the filtration media.

4. The filter product of claim 1, wherein the media engagement elements comprise tooth-like projections defining a series of peaks and troughs, and side media engagement elements of the supporting frame mesh with side media engagement elements of the hold down frame.

5. The filter product of claim 4, wherein the support frame and the hold down frame each comprise a pair of spaced side frame components and a pair of end frame components with each side frame component comprising the plurality of media engagement elements arranged in series along the side frame components, and the media engagement elements comprise tooth-like projections defining a series of peaks and troughs so that side media engagement elements of the supporting frame mesh with side media engagement elements of the hold down frame.

6. The filter product of claim 5, wherein the filtration media comprises a pleated media positioned between the side media engagement elements of the support frame and the hold down frame on spaced sides of the filter product, wherein the supported filtration media extends beyond the side media engagement elements.

7. The filter product of claim 6, wherein the pleated media comprises particulate matter within its composition.

8. The filter product of claim 6, wherein each support frame side component comprises a sidewall that is spaced from its respective side media engagement elements by a wall portion interconnected between the side media engagement elements and the spaced sidewall so as to define a channel in between.

9. The filter product of claim 8, wherein the media engagement elements of the support frame extend at an angle away from the sidewall on each support frame side component.

10. The filter product of claim 8, wherein each hold down frame side component comprises a gasket side wall that is spaced from its respective side media engagement elements by another wall portion interconnected between the side media engagement elements and the spaced gasket side wall to define a side wall channel in between, and the gasket side wall of the support frame is positioned within the side wall channel of the hold down frame.

11. The filter product of claim 10, further comprises a releasable snap connection between the side wall of at least one support frame side component and the gasket side wall of at least one hold down frame side component.

12. The filter product of claim 11, wherein the snap connection comprising a flange extending from the side wall of at least one support frame side component and a lock protrusion that extends from the gasket side wall of the hold down frame side component within the hold down frame side channel to releasably lock the flange within a space defined by the lock protrusion within the hold down frame side channel.

13. The filter product of claim 12, wherein the lock protrusion includes a sloped lock surface to fit beneath the flange, which slope increases the space defined by the lock protrusion within the hold down frame side channel as the sloped lock surface extends from the gasket side wall.

14. The filter product of claim 10, wherein the side media engagement elements of the hold down frame extend at an angle away from the gasket side wall on each hold down frame side component.

15. The filter product of claim 14, wherein the gasket side wall includes a flared portion that comprises at least a portion of an application mounting gasket of the filter product.

16. The filter product of claim 1, wherein the end frame components of the support frame and the hold down frame include end media engagement elements that extend toward one another and define a filtration media compression zone between them for securing the filtration media in place proximal to an end of the filtration media.

17. The filter product of claim 16, wherein the end frame component of the support frame comprises an end wall spaced from its end media engagement element by a wall portion so as to define a channel in between, and the end media engagement element extends at an angle away from the spaced end wall.

18. The filter product of claim 17, wherein the end component of the hold down frame comprises a gasket end wall spaced from its end media engagement element by a wall portion so as to define a channel in between, and the end wall of the support frame is positioned within the end wall channel of the hold down frame.

19. The filter product of claim 18, wherein the gasket end wall includes a flared portion that comprises at least a portion of an application mounting gasket of the filter product.

20. A filter product comprising filtration media and a frame assembly provided along at least a portion of the filtration media, the filter product having an input face and an output face of the filtration media for permitting carrier fluid to pass therethrough while removing a filtrate component, the frame assembly comprising:

a support frame having a length and extending along at least the portion of the filtration media, the support frame comprising a wall portion and at least one media engagement element spaced from the wall portion and arranged in supporting contact with and proximal to an edge of the filtration media on a first side of the filtration media; and a hold down frame having a length and extending along at least the portion of the filtration media, the hold down frame comprising a wall portion and at least one media engagement element spaced from the wall portion and arranged in supporting contact with and proximal to the edge of the filtration media on a second side of the filtration media;

wherein the support frame and hold down frame are interactively assembled together to provide the frame assembly proximal to at least a portion of the edge of the filtration media with the media engagement elements of the support frame interacting with the media engagement elements of the hold down frame to support the filtration media inbetween by contacting the filtration media at its first and second sides, and substantially all of the wall portion of one of the support frame and the hold down frame is positioned between the media engagement element and wall portion of the other.

21. A filter product comprising filtration media and a frame assembly provided along at least a portion of the filtration media, the filter product having an input face and an output face of the filtration media for permitting carrier fluid to pass therethrough while removing a filtrate component, the frame assembly comprising:

a support frame having a length and extending along at least the portion of the filtration media, the support frame comprising at least one media engagement element arranged in supporting contact with and proximal to an edge of the filtration media on a first side of the filtration media; and a hold down frame having a length and extending along at least the portion of the filtration media, the hold down frame comprising at least one media engagement element arranged in supporting contact with and proximal to the edge of the filtration media on a second side of the filtration media;

wherein the support frame and hold down frame are interactively assembled together to provide the frame assembly proximal to at least a portion of the edge of the filtration media with the media engagement elements of the support frame interacting with the media engagement elements of the hold down frame to support the filtration media inbetween by contacting the filtration media at its first and second sides, and both the support frame and the hold down frame further includes a wall portion spaced from its media engagement elements with its media engagement elements angled away from their wall portions.

\* \* \* \* \*